US010728430B2

(12) United States Patent
Mine et al.

(10) Patent No.: US 10,728,430 B2
(45) Date of Patent: Jul. 28, 2020

(54) SYSTEMS AND METHODS FOR DISPLAYING OBJECT FEATURES VIA AN AR DEVICE

(71) Applicant: Disney Enterprises, Inc., Burbank, CA (US)

(72) Inventors: Mark R. Mine, Burbank, CA (US); Steven M. Chapman, Thousand Oaks, CA (US); Alexa L. Hale, Burbank, CA (US); Calis O. Agyemang, Burbank, CA (US); Joseph M. Popp, Cerritos, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/296,147

(22) Filed: Mar. 7, 2019

(65) Prior Publication Data
US 2019/0281194 A1    Sep. 12, 2019

Related U.S. Application Data

(60) Provisional application No. 62/639,925, filed on Mar. 7, 2018.

(51) Int. Cl.
*H04N 5/222*    (2006.01)
*G06F 3/01*    (2006.01)
*G06T 11/60*    (2006.01)
*G06T 7/73*    (2017.01)
(Continued)

(52) U.S. Cl.
CPC ........... *H04N 5/2228* (2013.01); *G06F 3/011* (2013.01); *G06K 9/00201* (2013.01); *G06K 9/00671* (2013.01); *G06T 7/73* (2017.01); *G06T 7/90* (2017.01); *G06T 11/60* (2013.01)

(58) Field of Classification Search
CPC ...... H04N 5/2228; H04N 5/2224; G06T 7/73; G06T 7/90; G06T 11/60; G06T 7/246; G06T 2207/10016; G06T 2207/10024; G06K 9/00201; G06K 9/00671; G06F 3/011; G06F 3/0346
See application file for complete search history.

(56) References Cited

U.S. PATENT DOCUMENTS

| 2017/0124770 | A1* | 5/2017 | Vats | G06T 19/20 |
| 2018/0173404 | A1* | 6/2018 | Smith | G06F 3/04842 |
| 2019/0235636 | A1* | 8/2019 | Marcolina | G06F 1/163 |

OTHER PUBLICATIONS

Tsai, "Augmented reality is conquering new frontiers with Star Wars", Mar. 3, 2016, (Year: 2016).*

(Continued)

*Primary Examiner* — Maurice L. McDowell, Jr.
(74) *Attorney, Agent, or Firm* — Dorsey & Whitney LLP

(57) ABSTRACT

Systems and methods for displaying object features via an AR device are disclosed. The method may include receiving, from a transmitter, a signal from an object on a movie set. The signal may specify object data. The object may be a prop. The object data may specify one or more features corresponding to the prop. The method may include generating, with the one or more physical computer processors and the one or more AR components, a representation of the one or more features using visual effects to depict at least some of the object data. The method may include displaying, via the AR device, the representation onto a view of the prop.

20 Claims, 7 Drawing Sheets

(51) Int. Cl.
*G06T 7/90* (2017.01)
*G06K 9/00* (2006.01)

(56) References Cited

OTHER PUBLICATIONS

Dimitrov, "Towards a World of Totally Identified Objects", 2009, IEEE, pp. 83-88. (Year: 2009).*

* cited by examiner

SYSTEMS AND METHODS FOR DISPLAYING OBJECT FEATURES VIA AN AR DEVICE

CROSS REFERENCE TO RELATED APPLICATIONS

The present application claims priority to U.S. Provisional Patent Application No. 62/639,925, filed Mar. 7, 2018, the contents of which are incorporated herein by reference in its entirety.

TECHNICAL FIELD

The present disclosure relates generally to augmented reality.

BRIEF SUMMARY OF THE DISCLOSURE

Embodiments of the disclosure are directed to systems and methods for displaying object features via an AR device.

In one embodiment, a computer-implemented method for presenting qualitative visualizations corresponding to one or more objects may be implemented in an augmented reality (AR) device. The AR device may include one or more capture devices, one or more AR components, one or more physical computer processors, non-transient electronic storage, and a display. The method may include receiving, from a transmitter, a signal from an object on a movie set. The signal may specify object data. The object may be a prop. The object data may specify one or more features corresponding to the prop. The method may include generating, with the one or more physical computer processors and the one or more AR components, a representation of the one or more features using visual effects to depict at least some of the object data. The method may include displaying, via the AR device, the representation onto a view of the prop.

In embodiments, the one or more features may include a virtual extension of the prop, information on what character of a movie owns the prop, how heavy a prop is supposed to be in the movie, and what the prop can do in the movie.

In embodiments, the representation illustrates a range of a virtual explosion of the prop.

In embodiments, the representation illustrates a virtual character.

In embodiments, the method may further include displaying, with an AR device, a second representation based on a user interaction.

In embodiments, the user interaction may includes one or more of a body movement, a hand gesture, a gaze, and a sound.

In embodiments, the one or more features may include one or more of a functionality of the object, a capability of the object, and a control interface of the object.

In one embodiment, a computer-implemented method for presenting qualitative visualizations corresponding to one or more object may be implemented in an augmented reality (AR) device. The AR device may include one or more capture devices, one or more AR components, one or more physical computer processors, non-transient electronic storage, and a display. The method may include receiving, from a transmitter, a signal from an object on a movie set. The signal may specify object data. The object may be a camera accessory. The object data may specify one or more features corresponding to the camera accessory. The method may include simulating, with the one or more physical computer processors and the one or more AR components, capture of the movie set using at least some of the object data. The method may include displaying, via the AR device, the capture onto a view of the movie set.

In embodiments, the camera accessory may be one or more camera lenses. The capture of the movie set may simulate one of the one or more camera lenses.

In embodiments, a virtual user interface may be capable of receiving user input to change the capture to simulate a different one of the one or more camera lenses.

In embodiments, the camera accessory may be a dolly. The capture of the movie set may simulate capturing content while moving on the dolly.

In embodiments, the method may further include generating, with the one or more physical computer processors and the one or more AR components, a representation of the one or more features using visual effects to depict at least some of the object data. The method may include displaying, via the AR device, the representation. The representation may illustrate the locations of the dolly corresponding to the capture.

In embodiments, the camera accessory may be a crane. The capture of the movie set may simulate capturing content while moving on the crane.

In one embodiment, a computer-implemented method for presenting qualitative visualizations corresponding to one or more object may be implemented in an augmented reality (AR) device. The AR device may include one or more capture devices, one or more AR components, one or more physical computer processors, non-transient electronic storage, and a display. The method may include receiving, from a first transmitter, a first signal from a first object on a movie set. The first signal may specify first object data. The first object may be a camera accessory. The first object data may specify one or more first features corresponding to the camera accessory. The method may include receiving, from a second transmitter, a second signal from a second object on the movie set. The second signal may specify second object data. The second object may be a prop. The second object data may specify one or more second features corresponding to the prop. The method may include generating, with the one or more physical computer processors and the one or more AR components, a first representation of the one or more first features using visual effects to depict at least some of the first object data. The method may include generating, with the one or more physical computer processors and the one or more AR components, a second representation of the one or more second features using visual effects to depict at least some of the second object data. The method may include displaying, via the AR device, the first representation onto a view of the movie set and a second representation onto the prop.

In embodiments, the method may further include generating, with the one or more physical computer processors and the one or more AR components, a third representation based on user interaction causing the first representation to appear to come into contact with the second representation. The method may further include displaying, via the AR device, the third representation.

In embodiments, the third representation may apply red to the first representation and the second representation.

In embodiments, the camera accessory may be a dolly. The prop may represent a virtual character. The user interaction may cause a first representation illustrating a dolly moving toward the second representation illustrating the virtual sword, and the third representation applies red to the first representation and the second representation when the virtual dolly would be in contact with the virtual sword.

In embodiments, the user interaction may includes one or more of a body movement, a hand gesture, a gaze, and a sound.

In embodiments, the method may further include simulating, with the one or more physical computer processors and the one or more AR components, capture of the movie set using at least some of the first object data and at least some of the second object data. The method may include displaying, via the AR device, the capture onto a view of the movie set.

In embodiments, the capture may includes the second representation onto the prop.

Other features and aspects of the disclosed technology will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

In filmmaking, various equipment, set pieces, directors, crew, and actors move around a space to set up and film a shot. Multiple shots may need to be practiced due to difficult choreography, intricate shots that require a lot of moving equipment, equipment mistakenly showing up in a shot, and/or actors not realistically interacting with green screen characters. The presently disclosed technology exploits AR technology to provide qualitative visualizations of various objects, which may include information on what an object is, how to use the object, and the extent of its capabilities.

In accordance with various embodiments, an augmented (AR) experience can be presented to a user through which features corresponding to objects, such as functionalities, capabilities, and control interfaces, are displayed via an AR device. The AR device may be used on a movie set or television set to set up a shot more easily for all people involved (e.g., crew, actors, directors, etc.). By leveraging AR technologies, the user can visualize information about the object (e.g., what an object does or is, the extent of its functionality, how to use it, etc.). This may be helpful for using capture devices (e.g., cameras, microphones, etc.), capture device accessories (e.g., cranes, dollies, lenses, tripods, etc.), props (e.g., squibs, "green screen" props, props attached to actors, etc.), etc.

As used herein, an AR device refers to any device capable of displaying a real-time view of a physical, real-world environment while altering elements within the displayed view of the environment. As such, an AR device displays a view of the real world but augments (e.g., adds or modifies) elements using computer graphics technology. Such an AR device may include and/or be communicatively coupled to a capture device (or multiple capture devices) used to capture a view of the real-world environment and may further include computer software and/or hardware configured to augment elements of the captured scene. When a user looks through or at the AR device, the user sees an augmented view of the physical real-world environment in which the user is located.

Figure 1:
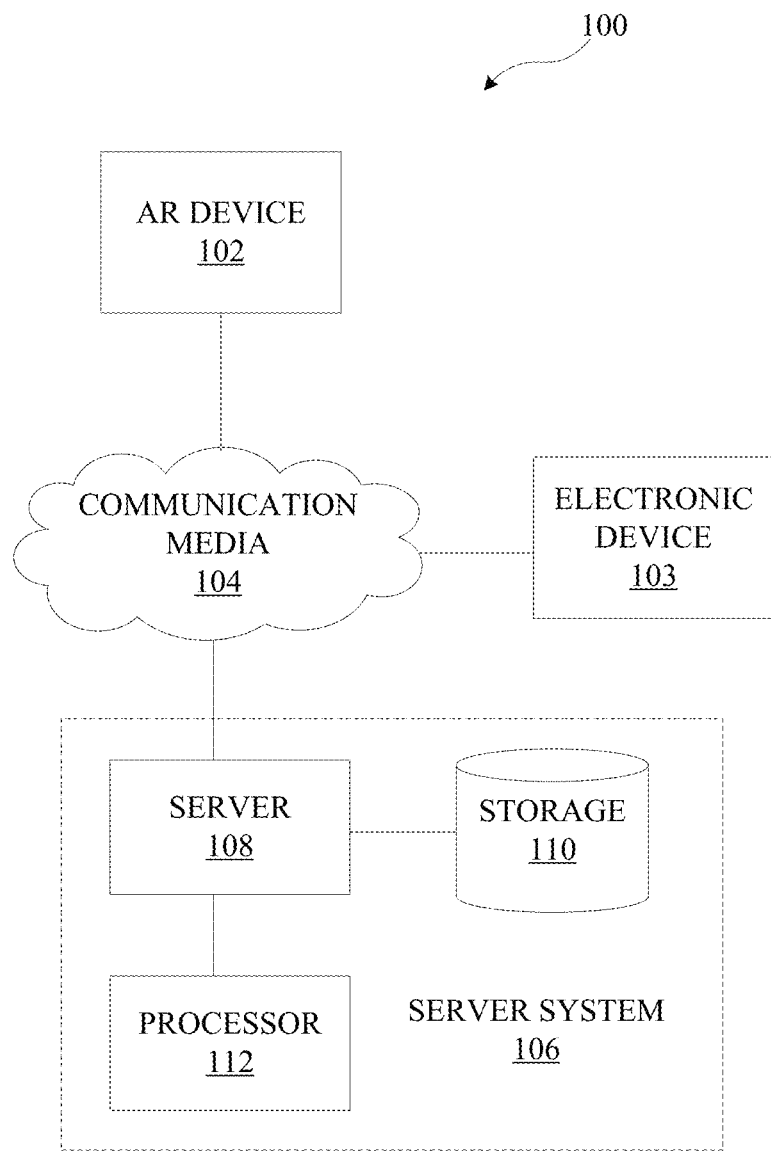
FIG. 1 illustrates an example augmented reality (AR) system in accordance with various embodiments of the present disclosure.

FIG. 1 depicts example environment 100, which may be used in connection with implementing embodiments of the disclosed systems, methods, and devices. By way of example, the various below-described components of FIG. 1 may be used to display one or more object features. One or more objects may include one or more object features. The one or more object features may be based on object data, which includes corresponding metadata. The one or more objects may have communication capabilities, such as for example, Bluetooth beacons, RFID, etc., to communicate the object data to AR device 102. The object data may be communicated to AR device 102 via communication media 104. In embodiments, the communication capabilities may be used to track and find objects on set, in a warehouse, and/or other locations.

As used herein, the one or more objects may include capture devices (e.g., cameras, microphones, etc.), capture device accessories (e.g., dollies, tracks, cranes, tripods, cranes, lenses, lighting equipment, etc.), people, characters, props (e.g., swords, houses, fences, cups, green screen props, etc.), and/or other objects. The one or more object features may include one or more functionalities (i.e., what a given object does), capabilities (i.e., ranges of the functionality), control interfaces (i.e., how to use a given object), etc. For example, the functionalities may indicate a camera captures images and/or videos; the capabilities may indicate the camera can zoom in at a minimum and/or maximum given rate and has a given field of view; the control interfaces may be virtual or physical control interfaces to indicate how to start recording, how to zoom a camera in, etc.

As used herein, the object data may include the technical specifications of the object, the size of the object, a color of the object, how other objects can interact with the object (e.g., a lens coupling to a camera, a tripod coupling to a camera, etc.), a range of motion of the object (e.g., how far an actor can kick, how high or low a tripod can get, etc.), a field of view of the object, a status of the object (e.g., on/off, recording, playing, etc.), how to operate the object (e.g., press a first button on a first object to record, press a second button on the first object to zoom, press a first button on a second object to activate, release clamps on a third object to lower, etc.), control interfaces of the object (e.g., physical controls and where they are located and/or virtual controls that may be used to apply visual effects to the object), etc. The metadata may include the name of the object, whether the object corresponds to a character in the content, whether the object corresponds to a location in the content, a date the object was manufactured, created, distributed, and/or released, a version of the object, upcoming updates, a diffusiveness of a virtual object, a range of light intensity emanating from the virtual object, a reflectivity of the virtual object, etc.

AR device 102 may send the object data to server system 106. In some embodiments, AR device 102 may capture a marker on an object via one or more capture devices that matches object data stored in storage 110 that corresponds to the object. This may improve the speed of displaying the one or more object features from the object to AR device 102 by minimizing the amount of data sent from the object to AR device 102. Object data may be used to generate a representation of the one or more object features. The representation may be qualitative and/or quantitative indicators of the one or more features based on the object data. The representation of the one or more features may be displayed on AR device 102. For example, the representations may include instructions on how to use the object, ranges of use of the object, different parts of the object and the corresponding uses and capabilities, additional parts that may be generated post-editing using visual effects, virtual characters that may be represented by the object, clothing and/or accessories added to a character, etc. In some embodiments, alternate perspectives of the user, which may be captured by additional capture devices, may be displayed to help choreograph action sequences, movements, interaction with virtual characters or props, etc.

The object data may be received, stored, retrieved, and/or obtained. Object data may be retrieved from a database in storage 110. The object data may be used to generate representations of the one or more object features. The representations may be displayed on AR device 102, overlaid onto the visual scene based on the field of view of the user.

The representations may be displayed based on user interaction. For example, a real-world object may remain un-augmented unless a user interacts with AR device 102. User interaction may include gesturing toward the real-world object, moving toward the real-world object, saying something about the real-world object, gazing toward the real-world object, and/or other user interactions. For example, a plastic handle may be used as a model to simulate a virtual sword. The object data corresponding to the plastic handle may be used to generate and display the virtual sword as may be seen in the final edited content. Qualitative information may include how heavy the virtual sword should be, how the virtual sword can be used, etc. When a user moves toward the plastic handle, the virtual sword may be displayed.

In another example, a virtual car may be placed in a location on a movie set. The virtual car may drive through the set and crash into a building. The representation may include an intact version of the car and a destroyed version of the car. The representation may include interactable virtual controls to allow a user to switch between the intact version and the destroyed version. The representation may include information on how to view the driving sequence. The representation may qualitatively display a starting point and an end point of the car, such that the starting point is the intact car and the ending point is a destroyed car. A user may be able to view how the virtual car is programmed to drive on the set.

In one instance, an actor may be able to use AR device 102 to practice diving out of the way of the virtual car to make the car seem more realistic. In another instance, a director may want to move a camera on a dolly while it pans. The director might use AR device 102 to generate a representation of a camera they plan to use, a length of dolly they plan to use, and the virtual car in the example above. The representation may qualitatively visualize how a camera might move on the dolly, what the camera may capture in the envisioned shot, as well as how the virtual car may move. Using AR device 102, the director may realize that the envisioned shot needs to be changed because the end of the shot captures part of the dolly, or captures something beyond the green screen, or captures a crane holding up a prop in the film, etc. AR device 102 may represent the envisioned shot by generating qualitative information (e.g., rate the camera can pan by moving the virtual camera at that rate, rate the camera can move on the dolly by moving the virtual dolly at that rate, etc.).

It should be appreciated that additional user interaction may reveal additional representations. Continuing one of the examples above, once the user is holding the plastic handle and sees the virtual sword, gazing toward the handle may reveal additional metadata about the virtual sword, such as the owner of the virtual sword, the length of the virtual sword, etc. Representations may persist for a time period after the user interaction stops (e.g., 5 seconds, 10 seconds, 30 seconds, one minute, 30 minutes, etc.). In some embodiments, the representations may be immediately dismissed by the user through the user interactions (e.g., blinking three times, swiping in an x with the user's fingers, etc.). In embodiments, the representations may last for the duration of the user interaction.

AR device 102 may generate and/or communicate location information, camera information (e.g., intrinsic camera information and extrinsic camera information), and/or other information which may be used to generate the representations.

In embodiments, location information may include the real-world location of AR device 102. The location information may be determined using GPS, Bluetooth, RFID, a cellular receiver, a network interface card, an altimeter, and/or other technology. The location information may be processed by processor 112 to determine the geographical coordinates of AR device 102. For example, application software installed in storage 110 may use the location of AR device 102 from a GPS reading (e.g., stored or retrieved from a network) to determine the geographical coordinates of AR device 102. The location information may be used in generating the representations such that the representations account for the perspective of the user and reflect appropriate positions and orientations of virtual objects.

In embodiments, camera information may include the angle that the camera is facing, the direction the camera is facing, the camera orientation, the shutter speed, the field of view, the f stop, the film speed, the focal length, aperture, etc. Location information and camera information may be used to generate the representations.

The representation may be generated based on the location information and/or camera information of AR device 102, as well as the object data. For example, the representation may be directed to face the user of AR device 102, such that the representation can be more easily understood by the user. The distance from a given object may be used to appropriately scale the representation corresponding to the object. The representation may be displayed on a display of AR device 102. The representation may dynamically change based on the movement of AR device 102.

In embodiments, the representation and the video may be composited and/or rendered through a graphics engine and/or a game engine. One of skill in the art will appreciate different technologies may be used to composite, render, and/or generate the representation. The representation may be overlaid on the display of AR device 102.

In embodiments, the real-time, real-world video and the representation may be composited and displayed as a video on a display device, such as a monitor, TV, and/or VR system. As used herein, the term "virtual reality" or "VR" generally refers to a simulation of a user's presence in an environment, real or imagined, such that the user may interact with it. Server system 106 generating the real-world video and the representation may use the location information, the camera information, and the object data to composite the content. The location information and camera information from AR device 102 may be used to determine what region AR device 102 is capturing.

As shown in FIG. 1, environment 100 may include one or more of AR device 102, electronic device 103, and server system 106. AR device 102 can be coupled to electronic device 103, and/or server system 106 via communication media 104. As will be described in detail herein, AR device 102, and/or server system 106 may exchange communications signals, including object data, metadata, object features, location information, camera information, video, content, representations, and/or other information via communication media 104.

AR device 102 may include, for example, a head-mounted display, a see-through display, an optical see-through display, a video see-through display, a visor, glasses, etc., or as part of another user device, such as a laptop PC. AR device 102 may include an AR component, one or more capture devices, a display, one or more sensors, such as an accelerometer, a communications unit, and/or a memory unit. The AR component may use an accelerometer to determine when the position of AR device 102 is changing, for example, which could indicate that the position of AR device 102 relative to the one or more objects is changing. Generally, the accelerometer is a device capable of measuring the physical acceleration of AR device 102. The display of AR device 102 may include a graphical user interface. It should be appreciated that the content being captured and the representations may be composited for a VR display and/or standard display.

In embodiments, the AR component may on its own, or with assistance from the accelerometer, determine the positioning of the representation relative to AR device 102. The AR component may be configured to identify or otherwise recognize markers on the one or more objects. For example, the markers may be an embedded watermark, a quick response (QR) code that specifies the object and the position of the object, an RFID, and/or other markers. It should be appreciated that any type of marker capable of identifying the one or more objects and communicating the corresponding object data may be used. The AR component could detect the marker using one or more capture devices and the corresponding object and object data. In some embodiments, the object may send a signal to AR device 102. In some embodiments, the embedded marker may be impossible or difficult to detect using the human eye. For example, the embedded marker could be expressed using an infrared-absorbing material that is invisible or nearly invisible to the human eye.

AR component may provide qualitative visualizations corresponding to the objects. These can vary significantly for different objects. For example, a representation for a crane may include a range of motion of the crane by generating a representation that swings a virtual crane through its full motion. The rate of the swing may also represent the rate at which the crane can move. The representation may include a virtual anvil with a weight on it (e.g., 200 lbs) to indicate a weight the crane may be able to hold. The representation may include more likely objects that may be carried by the crane to represent a max weight the crane may hold as well.

The AR component may be configured to generate a virtual representation of the environment such that virtual objects may interact with each other as real objects do in real-life. In one example, a dolly may be used in a shot capturing an actor moving through a scene. In one envisioned shot, the director may want to get as close as possible to the actor after he heroically leaps off a ledge. AR component will allow a director to see how close the dolly and camera can get, without interacting with a representation of the actor, by using a virtual camera and virtual dolly. The virtual camera may provide various representations when the virtual camera would come into contact with the representation of the actor (e.g., red, loud noise, etc.). This may allow a director to save time trying to choreograph a scene with real actors and equipment that may need to be fine-tuned.

AR component may also allow a user of AR device 102 to interact with the representations. For example, selecting parts of a virtual control panel, picking up virtual objects, moving virtual representations on a physical object, revealing additional representations related to the object, etc. AR component may use displayed representations, location information, sensors, captured content, etc. to allow a user to interact with the representations.

A capture device may include a camera, a microphone, webcam, etc. The capture device may capture images, videos, sounds, and/or other content, which may then be displayed and/or presented to a user through AR device 102. The capture device may be able to capture user interaction to display the representations. The one or more sensors may also be used to capture user interaction.

Electronic device 103 may include a variety of electronic computing devices, such as, for example, a smartphone, tablet, laptop, computer, wearable device, television, etc. In embodiments, electronic device 103 includes components that may be used to display video, representations, images, and/or other audio/visual information, such as, for example, a television, a monitor, a laptop, a computer, wearable device, tablet, smartphone, etc. In various embodiments, communication media 103 may be based on one or more wireless communication protocols such as Wi-Fi, Bluetooth®, ZigBee, 802.11 protocols, Infrared (IR), Radio Frequency (RF), 2G, 3G, 4G, 5G, etc., and/or wired protocols and media. Communication media 104 may be implemented as a single medium in some cases.

Electronic device 103 may take a variety of forms, such as a desktop or laptop computer, a smartphone, a tablet, a smartwatch or other wearable electronic device, a television or other audio or visual entertainment device or system, or the like. AR device 102 and/or electronic device 103 may communicate with other devices and/or with one another over communication media 104 with or without the use of server system 106. In various embodiments, AR device 102, electronic device 103, and/or server system 106 may be used to perform various processes described herein and/or may be used to execute various operations described herein with regards to one or more disclosed systems and methods. It should be appreciated that environment 100 may include multiple AR devices 102, electronic devices 103, communication media 104, server systems 108, servers 110, processors 114, and/or storage 110.

As mentioned, communication media 104 may be used to connect or communicatively couple AR device 102, electronic device 103, and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. It should be appreciated that other ways may be used to implement communication media 104 for communications purposes.

Likewise, though not shown, it will be appreciated that a similar communication medium may be used to connect or communicatively couple server 108, storage 110, and/or processor 112 to one another in addition to other elements of environment 100. In example implementations, communication media 104 may be, or include, a wired or wireless wide area network (e.g., cellular, fiber, and/or circuit-switched connection, etc.) for AR device 102, electronic device 103, and/or server system 106, which may be relatively geographically disparate; and in some cases, aspects of communication media 104 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 106 may provide, receive, collect, or monitor information to/from AR device 102 and/or electronic device 103, such as, for example, object data, metadata, object features, location information, camera information, video, content, representations, security and encryption information, and the like. Server system 106 may be configured to receive or send such information via communication media 104. This information may be stored in storage 110 and may be processed using processor 112. For example, processor 112 may include an analytics engine capable of performing analytics on information that server system 106 has collected, received, etc., from AR device 102 and/or electronic device 103. Processor 112 may include an engine capable of generating, compositing, and/or displaying the representation and/or the video that server system 106 has collected, received, obtained, etc., from AR device 102. In embodiments, another engine may be used to composite the video and the representation. In embodiments, server 108, storage 110, and processor 112 may be implemented as a distributed computing network, a relational database, or the like.

Server 108 may include, for example, an Internet server, a router, a desktop or laptop computer, a smartphone, a tablet, a processor, or the like, and may be implemented in various forms, including, for example, an integrated circuit or collection thereof, a printed circuit board or collection thereof, or in a discrete housing/package/rack or multiple of the same. In embodiments, server 108 directs communications among AR device 102 and/or electronic device 103 over communication media 104. For example, server 108 may process and exchange messages among AR device 102 and/or electronic device 103 that relate to object data, metadata, object features, location information, camera information, video, content, representations, etc. Server 108 may update information stored on AR device 102 and/or electronic device 103. Server 108 may send/receive information to/from AR device 102 and/or electronic device 103 in real-time or sporadically. Further, server 108 may implement cloud computing capabilities for AR device 102 and/or electronic device 103.

Figure 2:
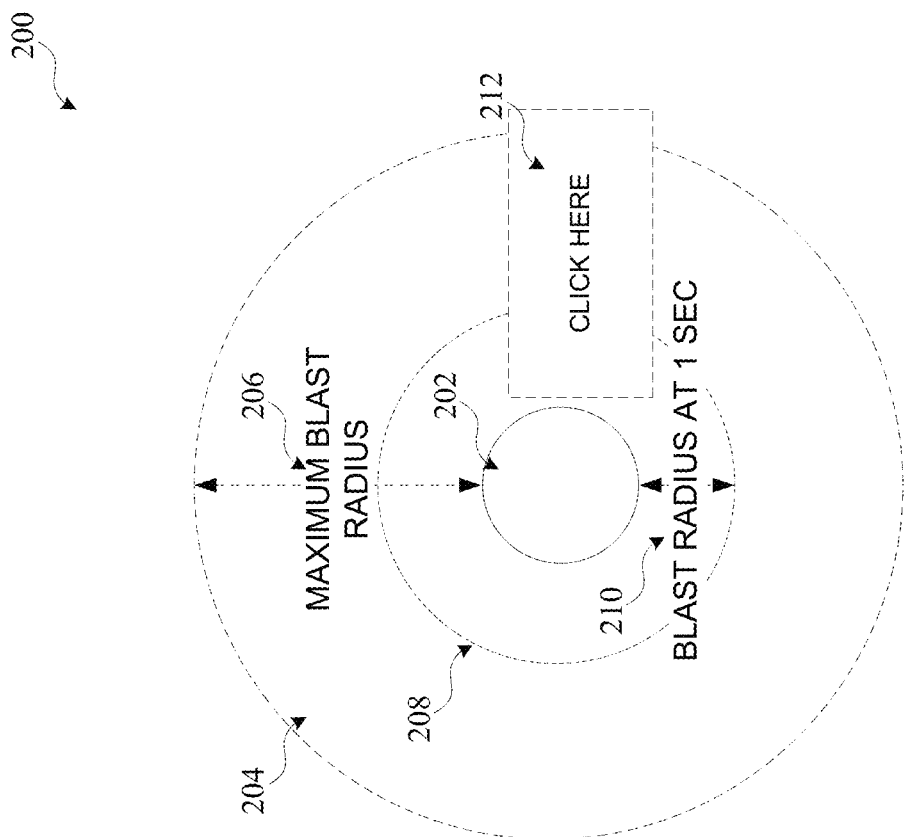
FIG. 2 illustrates an example object with one or more features displayed, in accordance with various embodiments of the present disclosure.

FIG. 2 illustrates an example object with one or more features displayed. in accordance with various embodiments of the present disclosure. AR view 200 may be of real world object (e.g., object 202) and representations (e.g., dashed circle 204, text and arrow 206, dashed circle 208, text and arrow 210, and dashed textbox 212.). AR view 200 may be a front view. Object 202 may be a real-world object that may be amplified post-capture using visual effects. For example, the visual effects may be an explosion. The maximum range of the post-visual effects explosion may be dashed circle 204, which is also indicated by text and arrow 206. Dashed circle 204 and text and arrow 206 may be visualized by a user using an AR device. A radius of the post-visual effect blast at one second may be represented by dashed circle 208 and text and arrow 210. Textbox 212 may represent a virtual control interface allowing an AR user to activate object 202 to see a virtual blast as it may appear post-capture visual effects. This may aid choreographing stunts by allowing an actor to user an AR device to better understand how the explosion might look after visual effects are applied. The user may activate the representations by walking toward object 202, gesturing toward object 202, saying the name of object 202, etc. Dashed circle 204, text and arrow 206, dashed circle 208, text and arrow 210, and dashed textbox 212 may be virtual items that an AR user may be able to see.

Figure 3:
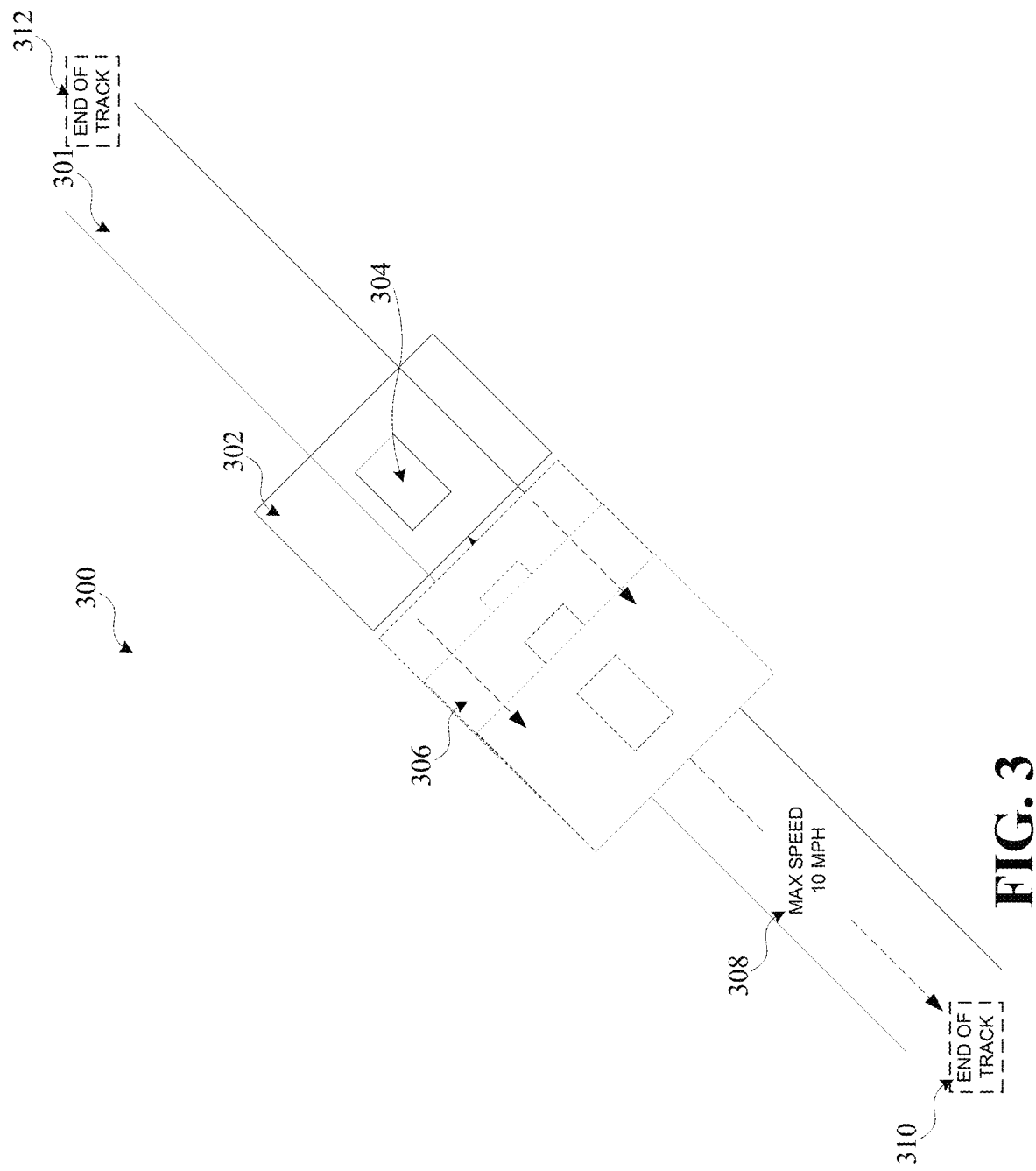
FIG. 3 illustrates an example object with one or more features displayed, in accordance with various embodiments of the present disclosure.

FIG. 3 illustrates an example object with one or more features displayed, in accordance with various embodiments of the present disclosure. AR view 300 may be of real world objects (e.g., track 301, dolly 302, and capture device 304) and representations (e.g., dashed dolly and capture device 306, text and arrow 308, dashed textbox 310, and dashed textbox 312.). AR view 300 may be an aerial view. Track 301 may be a track along which dolly 302 runs. Capture device 304 may be mounted to dolly 302. Dashed dolly and capture device 306 may represent the motion of dolly 302 and capture device 304 at maximum speed in the direction of the dashed arrows. Text and arrow 308 may represent a textual representation of a max speed of dolly 302. The max speed may represent a max safe speed, a max continuous speed based on a motor, or other device. Dashed textbox 310 may represent a textual representation of the end of the track. In some embodiments, a representation of dolly 302 and capture device 304 at the end of the track may be generated and displayed as well. Dashed textbox 312 is similar to dashed textbox 310, just on the other side of track 301. The user may activate the representations as described above. This may help a director understand the speed of the dolly, what other objects may come into view as the dolly moves in a shot, whether the dolly may hit or otherwise interact with other objects as it moves in a shot, etc. It should be appreciated that other representations may be generated and displayed based on a user's interactions with the real-world objects.

Figure 4:
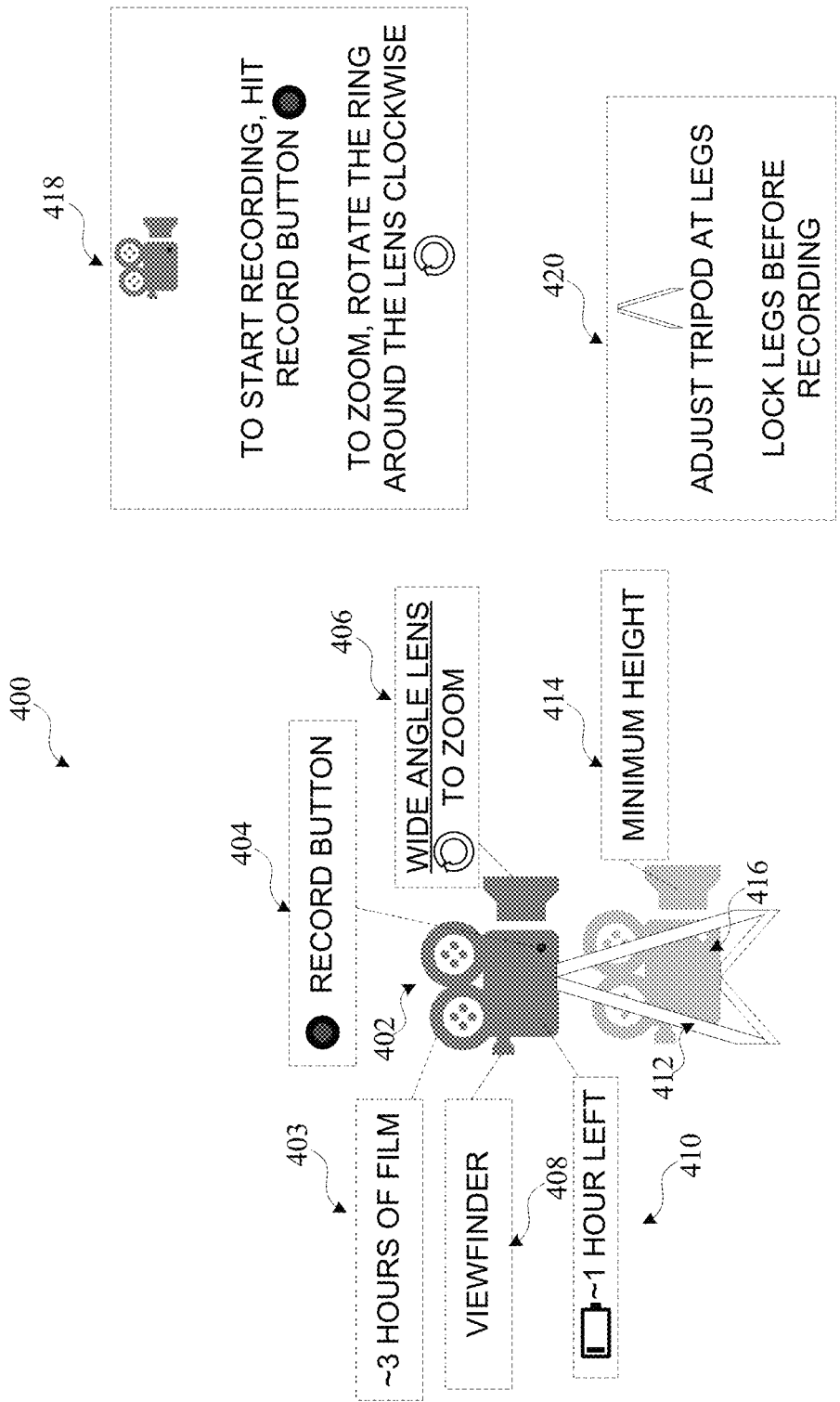
FIG. 4 illustrates an example object with one or more features displayed, in accordance with various embodiments of the present disclosure.

FIG. 4 illustrates an example object with one or more features displayed, in accordance with various embodiments of the present disclosure. AR view 400 may be of real world objects (e.g., capture device 402 and tripod 412) and representations (e.g., dashed textbox 403, dashed textbox 404, dashed textbox 406, dashed textbox 408, dashed textbox 410, dashed textbox 414, tripod and capture device 416, dashed textbox 418, and dashed textbox 420.). AR view 400 may be a side view. Capture device 402 may be a camera that is mounted to tripod 412. Dashed textbox 403 may represent a capability. Dashed textbox 403 may quantitatively indicate the amount of film available in the camera at a given time, the total amount of film capture device 402 is able to hold, and/or other information related to the film. Dashed textbox 404 may represent a functionality. Dashed textbox 404 may qualitatively indicate where and what the record button is through the representation. The camera may have a record button that looks like two concentric circles, whereby the outer circle is black and the inner circle is red.

Dashed textbox 406 may represent a functionality of the lens and a physical control interface. Dashed textbox 406 may qualitatively represent how to use the zoom feature of the lens. The type of lens is a wide angle lens. In order to zoom the lens in, the lens may need to be rotated clockwise.

Dashed textbox 408 may represent a functionality of capture device 402. Dashed textbox 408 may textually represent what a part of capture device 402 is. The viewfinder may be where a capture device operator looks through to see the field of view of the camera. Dashed textbox 410 may represent a capability of capture device 402. As illustrated, dashed textbox 410 may qualitatively and quantitatively represent the amount of battery left on capture device 402. It should be appreciated that the battery life may represent a max battery life for capture device 402 using manufacturer-approved batteries.

Dashed textbox 414 may represent a capability of tripod 412. Dashed textbox 414 may textually represent what tripod and capture device 416 illustrates. Tripod and capture device 416 may represent a capability of tripod 412. Tripod and capture device 416 may quantitatively represent the minimum height tripod 412 can be set. In some embodiments, this may be tied to capture device 402 and/or can be the minimum height of the tripod, regardless of what capture device is mounted to it. It should be appreciated that a maximum height may also be generated and displayed, even though it is not illustrated here.

Dashed textbox 418 may represent a physical and virtual control interface. Dashed textbox 418 may textually and qualitatively indicate how to use capture device 402. As illustrated, content may be captured by hitting the record button. A user may interact with the record button in dashed textbox 418 to start recording. Zooming may be accomplished by rotating the ring around the lens clockwise. A user may interact with the clockwise arrow in dashed textbox 418 to zoom the lens. Dashed textbox 420 may represent a physical and virtual control interface. Dashed textbox 420 textually and qualitatively indicates how to use capture device 402. As illustrated, the tripods may be adjusted at the legs. A user may Interact with the tripod in dashed textbox 420 to lower or heighten a representation of the tripod. For example, while not shown, there may be release and locking mechanisms. A warning is issued to lock legs before recording, which may be issued to ensure high quality content. The user may activate the representations as described above.

While not illustrated, it should be appreciated that different objects may be virtually used, or simulated, without receiving the physical counterpart. For example, a manufacturer may have a set of lenses, such as a wide angle lens, a prime lens, and a telephoto lens. The manufacturer may generate and/or send the object data for the lenses to an AR user and/or director. The AR device may obtain and/or retrieve the object data. The director may be able to see how a capture device might capture content using the different lenses based on the object data. For example, the object data may generate a virtual representation of the wide angle lens, such that content captured with the virtual wide angle lens may distort the content such that there is a spherical aberration. A director might not want the spherical aberration and may try the virtual telephoto lens. However, the virtual telephoto lens might not capture all of the environment the director wants to capture. The director might then try the virtual prime lens and see a sharp picture and a nice bokeh, but with no zoom capabilities, which may work for the scene the director is trying to shoot.

Figure 5:
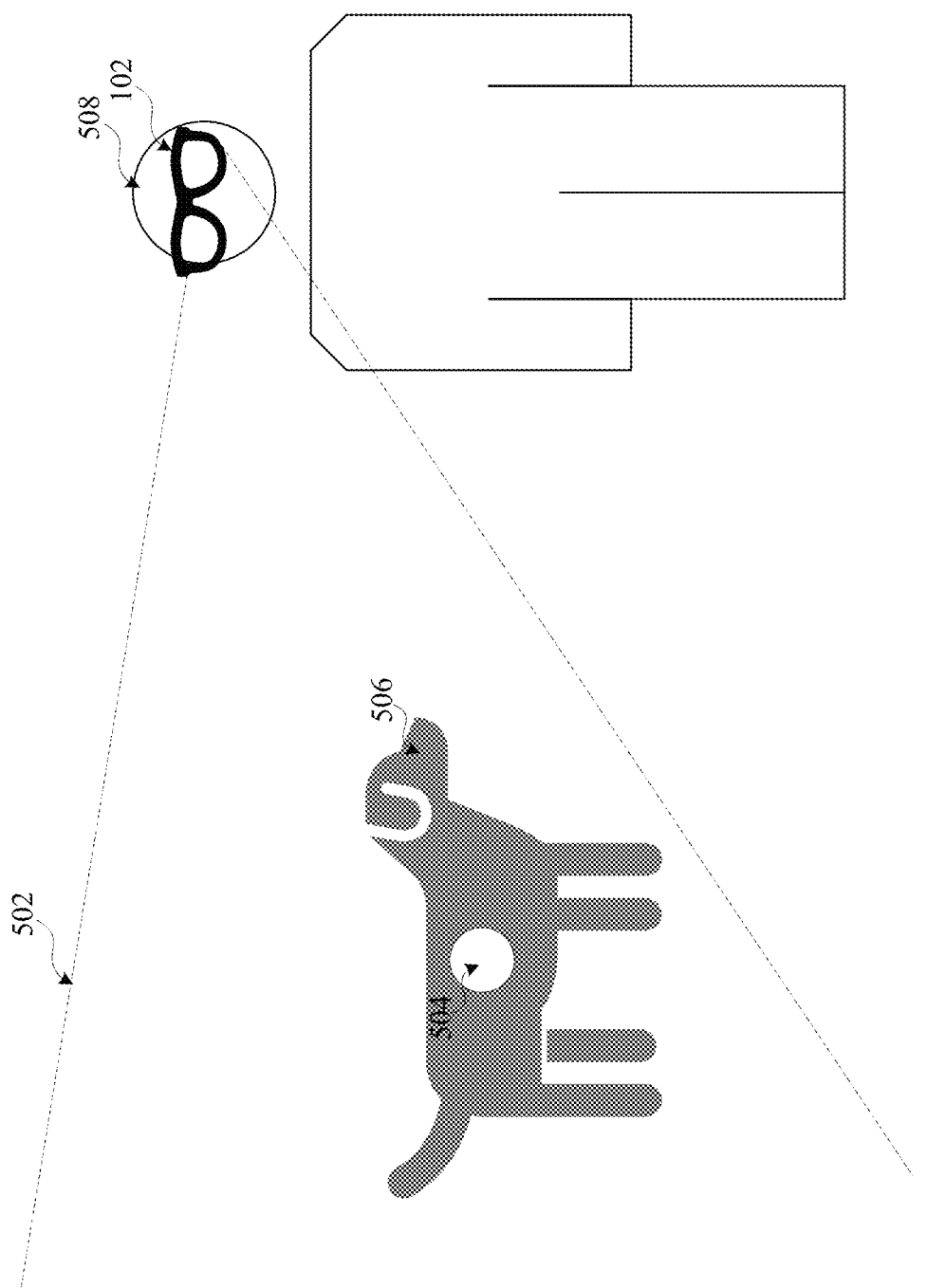
FIG. 5 illustrates an example object with one or more features displayed, in accordance with various embodiments of the present disclosure.

FIG. 5 illustrates an example object with one or more features displayed, in accordance with various embodiments of the present disclosure. AR view 502 may be of a real world object (e.g., object 504) and a representation (e.g., dog 506.). Object 504 may be a "green screen" object to which visual effects may be applied post-capture. User 508 may use AR device 102 (FIG. 1) to view object 504 to see dog 506. This may help actors and/or users to better interact with virtual characters in content. Instead of looking at a body of dog 506, user 508 may focus the attention on the eyes of dog 506 when talking directly to it. It should be appreciated that additional augmentations may be applied, such as costumes to real-life people, height augmentation using virtual effects, etc.

Figure 6A:
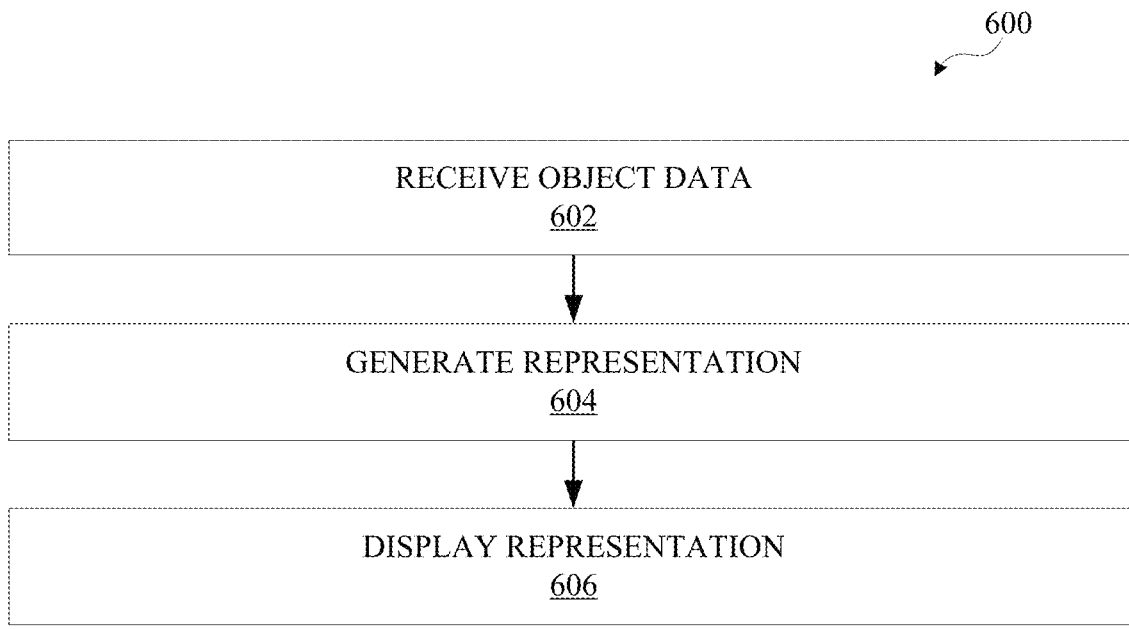
FIG. 6A is an operational flow diagram illustrating an example process for displaying object features via an AR device, in accordance with various embodiments.
Figure 6B:
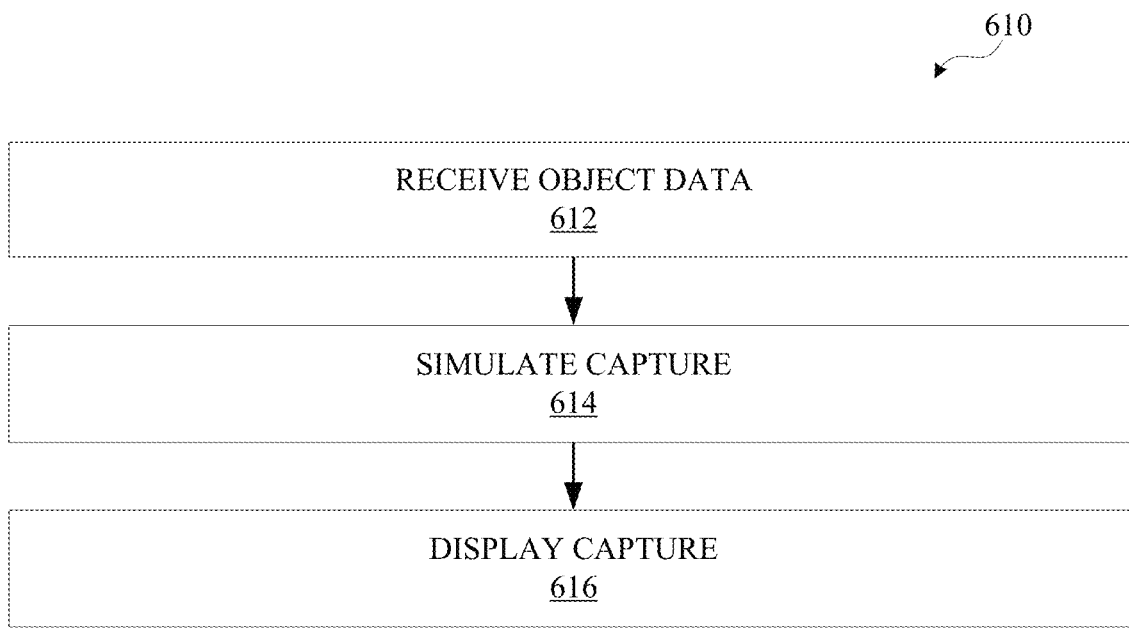
FIG. 6B is an operational flow diagram illustrating an example process for displaying object features via an AR device, in accordance with various embodiments.

FIGS. 6A and 6B are operational flow diagrams illustrating example processes for displaying object features in accordance with various embodiments. The operations of the various methods described herein are not necessarily limited to the order described or shown in the figures, and it should be appreciated, upon studying the present disclosure, that variations of the order of the operations described herein are within the spirit and scope of the disclosure.

The operations and sub-operations of the flow diagram may be carried out, in some cases, by one or more of the components, elements, devices, components, and circuitry of system 100. This may include one or more of: server system 106; server 108; processor 112; storage 110; and/or computing component 700, described herein and referenced with respect to at least FIGS. 1 and 7, as well as subcomponents, elements, devices, components, and circuitry depicted therein and/or described with respect thereto. In such instances, the description of the flow diagram may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc., referred to. Thus, it will be appreciated that aspects and features described above in connection with (sub-) components, elements, devices, circuitry, etc., including variations thereof, may be applied to the various operations described in connection with the flow diagram without departing from the scope of the present disclosure.

At 602, a signal may be received from an object on a movie set. The signal may specify object data. The object data may specify one or more features corresponding to one or more objects, as described above.

At 604, a representation of the one or more features may be generated. The representation may be generated using visual effects to depict at least some of the object data. The visual effects may include applying colors, creating virtual objects to augment a user's view of a real-world scene, affecting the field of view of a real-world scene (e.g., zoom, bokeh, sharpness, etc.), and/or other visual effects.

At 606, the representation may be displayed. In embodiments, a second representation may be displayed based on a user interaction.

612 may be similar to 602 described above.

614 may simulate capture of the movie set using at least some of the object data. Simulating capture may include generating captured content of the movie set from a camera on a crane at different heights, from a dolly in various locations, using different lenses, different camera settings, etc.

616 may display the capture onto a view of the movie set. The simulated capture may be from the perspective of the user. In some embodiments, the simulated capture may be from various perspectives based on the object being simulated (e.g., a different lens, a dolly, a crane, etc.). In embodiments, a virtual user interface may be generated and displayed. The virtual user interface may be capable of receiving user input to change the capture to simulate a different object.

It should be appreciated that multiple signals may be received from multiple objects allowing multiple representations and simulated captures. It should also be appreciated that flow diagram 600 and flow diagram 610 may be combined in various ways, even those that may now follow the order of the operations described above.

It should be appreciated that the presently disclosed technology may be used on movie sets or film sets to aid crew, cast, and directors in working with equipment, green screen objects, props, etc. The presently disclosed technology may allow a director to try various lenses (e.g., representations of different lenses without needing to actually switch out lenses), explore different lengths of track for a dolly (e.g., a representation showing what a camera might capture at different positions on the dolly without creating a physical track for a physical dolly, how a longer dolly might cut into a scene, etc.), try different pans and tilts (e.g., without needing to move the physical camera to different locations to try the pans and tilts), and/or try capturing content by holding the camera by hand or via a crane (e.g., without needing to carry a physical camera or attaching a physical camera to a crane). The representations allow for more creativity and experimentation by the director. The qualitative visualizations presented by the representations may allow a user to quickly realize the real-world capabilities of objects to prevent costly mistakes with crew and actors on set. Additionally, the one or more objects may also allow users to more quickly access updates and new versions of equipment, green screen objects, props, and/or other objects. The presently disclosed technology allows for more intuitive interaction with the one or more objects used in filmmaking to save time and money.

Figure 7:
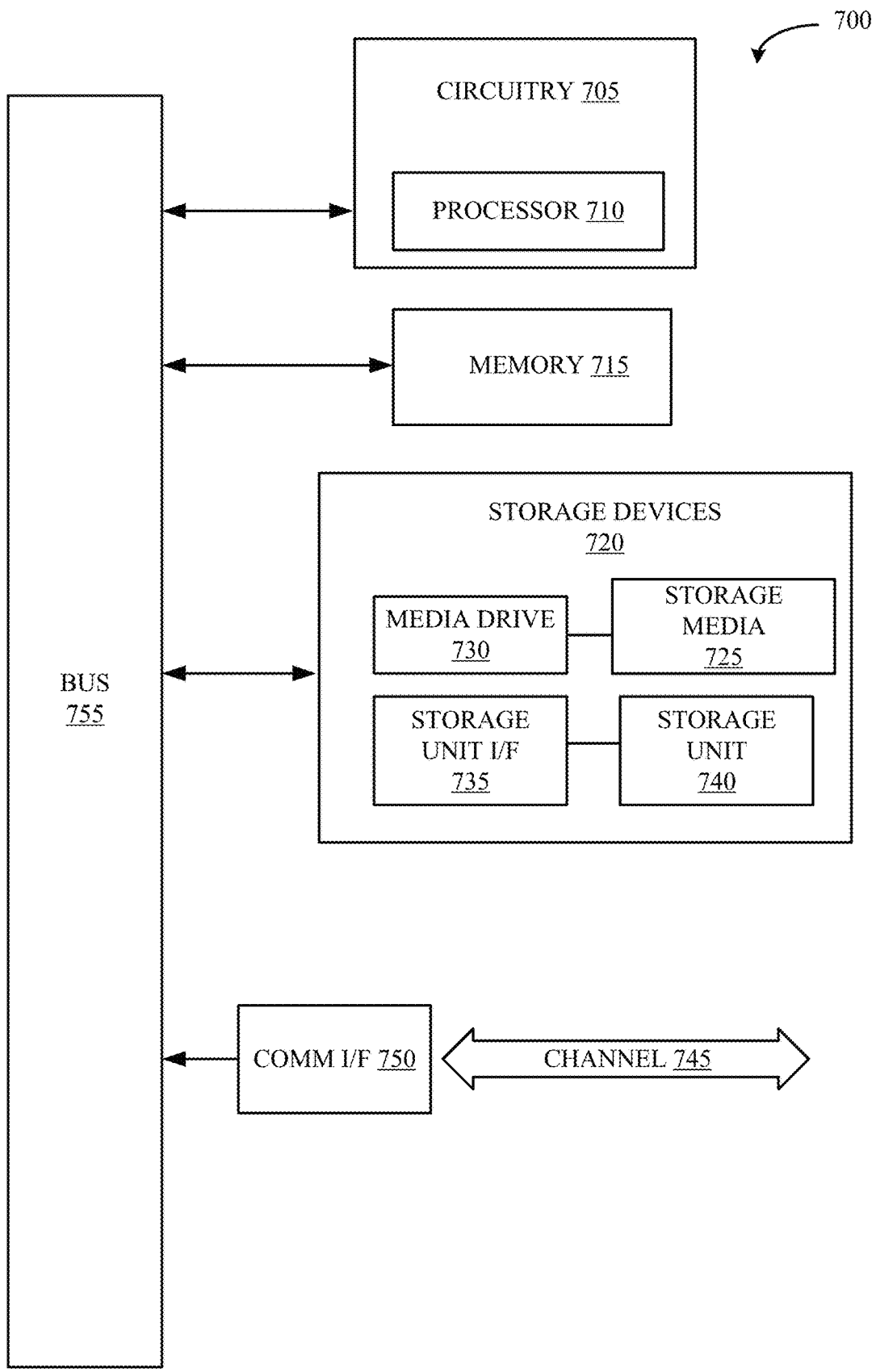
FIG. 7 is an example computing component that may be used to implement various features of embodiments described in the present disclosure.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines, or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where engines and/or components of the technology are implemented in whole or in part using software, in one embodiment, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the technology using other computing components or architectures.

Referring now to FIG. 7, computing component 700 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 700 is specifically purposed.

Computing component 700 may include, for example, one or more processors, controllers, control components, or other processing devices, such as a processor 710, and such as may be included in circuitry 705. Processor 710 may be implemented using a special-purpose processing engine such as, for example, a microprocessor, controller, or other control logic. In the illustrated example, processor 710 is connected to bus 755 by way of circuitry 705, although any communication medium may be used to facilitate interaction with other components of computing component 700 or to communicate externally.

Computing component 700 may also include one or more memory components, simply referred to herein as main memory 715. For example, random access memory (RAM) or other dynamic memory may be used for storing information and instructions to be executed by processor 710 or circuitry 705. Main memory 715 may also be used for storing temporary variables or other intermediate information during execution of instructions to be executed by processor 710 or circuitry 705. Computing component 700 may likewise include a read only memory (ROM) or other static storage device coupled to bus 755 for storing static information and instructions for processor 710 or circuitry 705.

Computing component 700 may also include one or more various forms of information storage devices 720, which may include, for example, media drive 730 and storage unit interface 735. Media drive 730 may include a drive or other mechanism to support fixed or removable storage media

725. For example, a hard disk drive, a floppy disk drive, a magnetic tape drive, an optical disk drive, a CD or DVD drive (R or RW), or other removable or fixed media drive may be provided. Accordingly, removable storage media 725 may include, for example, a hard disk, a floppy disk, magnetic tape, cartridge, optical disk, a CD or DVD, or other fixed or removable medium that is read by, written to, or accessed by media drive 730. As these examples illustrate, removable storage media 725 may include a computer usable storage medium having stored therein computer software or data.

In alternative embodiments, information storage devices 720 may include other similar instrumentalities for allowing computer programs or other instructions or data to be loaded into computing component 700. Such instrumentalities may include, for example, fixed or removable storage unit 740 and storage unit interface 735. Examples of such removable storage units 740 and storage unit interfaces 735 may include a program cartridge and cartridge interface, a removable memory (e.g., a flash memory or other removable memory component) and memory slot, a PCMCIA slot and card, and other fixed or removable storage units 740 and storage unit interfaces 735 that allow software and data to be transferred from removable storage unit 740 to computing component 700.

Computing component 700 may also include a communications interface 750. Communications interface 750 may be used to allow software and data to be transferred between computing component 700 and external devices. Examples of communications interface 750 include a modem or soft-modem, a network interface (such as an Ethernet, network interface card, WiMedia, IEEE 702.XX, or other interface), a communications port (such as for example, a USB port, IR port, RS232 port Bluetooth® interface, or other port), or other communications interface. Software and data transferred via communications interface 750 may typically be carried on signals, which may be electronic, electromagnetic (which includes optical), or other signals capable of being exchanged by a given communications interface 750. These signals may be provided to/from communications interface 750 via channel 745. Channel 745 may carry signals and may be implemented using a wired or wireless communication medium. Some non-limiting examples of channel 745 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 715, storage unit interface 735, removable storage media 725, and channel 745. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions may enable the computing component 700 or a processor to perform features or functions of the present application as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should be read to encompass conventional, traditional, normal, or standard technologies that may be available or known. Likewise, where this document refers to technologies that would be apparent or known to one of ordinary skill in the art, such technologies encompass those apparent or known to the skilled artisan.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for presenting qualitative visualizations corresponding to one or more objects, the method being implemented in an augmented reality (AR) device that includes one or more capture devices, one or more AR components, one or more physical computer processors, a non-transient electronic storage, and a display, the method comprising:
receiving, from a transmitter, a signal from a prop on a movie set, the signal specifying object data wherein the object data specifies one or more features corresponding to the prop;
generating, with the one or more physical computer processors and the one or more AR components, a representation of the one or more features using visual effects to depict at least some of the object data; and
displaying, via the AR device, the representation onto a view of the prop.

2. The computer-implemented method of claim 1, wherein the one or more features comprise at least one of: a virtual extension of the prop, information on a character of a movie that owns the prop, a weight of the prop reflected in the movie, or functionality of the prop in the movie.

3. The computer-implemented method of claim 1, wherein the representation illustrates a range of a virtual explosion of the prop.

4. The computer-implemented method of claim 1, wherein the representation illustrates a virtual character.

5. The computer-implemented method of claim 1, further comprising displaying, with the AR device, a second representation based on a user interaction with the prop.

6. The computer-implemented method of claim 5, wherein the user interaction comprises one or more of a body movement, a hand gesture, a gaze, and a sound.

7. The computer-implemented method of claim 1, wherein the one or more features comprise one or more of a functionality of the prop, a capability of the prop, and a control interface of the prop.

8. A computer-implemented method for presenting qualitative visualizations corresponding to one or more objects, the method being implemented in an augmented reality (AR) device that includes one or more capture devices, one or more AR components, one or more physical computer processors, a non-transient electronic storage, and a display, the method comprising:
receiving, from a transmitter, a signal from an object on a movie set, the signal specifying object data, wherein the object is a camera accessory, and wherein the object data specifies one or more features corresponding to the camera accessory;
simulating, with the one or more physical computer processors and the one or more AR components, capture of the movie set using at least some of the object data; and
displaying, via the AR device, the capture onto a view of the movie set.

9. The computer-implemented method of claim 8, wherein the camera accessory is one or more camera lenses and the capture of the movie set simulates an image through one of the one or more camera lenses.

10. The computer-implemented method of claim 9, wherein a virtual user interface is configured to receive user input to change the capture to simulate a different one of the one or more camera lenses.

11. The computer-implemented method of claim 8, wherein the camera accessory is a dolly, and wherein the capture of the movie set simulates capturing content while moving on the dolly within the movie set.

12. The computer-implemented method of claim 11, further comprising:
generating, with the one or more physical computer processors and the one or more AR components, a representation of the one or more features using visual effects to depict at least some of the object data; and
displaying, via the AR device, the representation, wherein the representation illustrates a plurality of locations of the dolly relative to the movie set corresponding to the capture.

13. The computer-implemented method of claim 8, wherein the camera accessory is a crane, and wherein the capture of the movie set simulates capturing content while moving on the crane within the movie set.

14. A computer-implemented method for presenting qualitative visualizations corresponding to one or more objects, the method being implemented in an augmented reality (AR) device that includes one or more capture devices, one or more AR components, one or more physical computer processors, a non-transient electronic storage, and a display, the method comprising:
receiving, from a first transmitter, a first signal from a first object on a movie set, the first signal specifying first object data, wherein the first object is a camera accessory, and wherein the first object data specifies one or more first features corresponding to the camera accessory;
receiving, from a second transmitter, a second signal from a second object on the movie set, the second signal specifying second object data, wherein the second object is a prop, and wherein the second object data specifies one or more second features corresponding to the prop;
generating, with the one or more physical computer processors and the one or more AR components, a first representation of the one or more first features using visual effects to depict a portion of the first object data; and
generating, with the one or more physical computer processors and the one or more AR components, a second representation of the one or more second features using visual effects to depict at least some of the second object data; and
displaying, via the AR device, the first representation onto a view of the movie set and a second representation onto the prop.

15. The computer-implemented method of claim 14, further comprising:
generating, with the one or more physical computer processors and the one or more AR components, a third representation based on user interaction causing the first representation to appear to come into contact with the second representation; and
displaying, via the AR device, the third representation.

16. The computer-implemented method of claim 15, wherein the third representation applies a color over to the first representation and the second representation.

17. The computer-implemented method of claim 16, wherein the camera accessory is a dolly, wherein the prop represents a virtual character, and wherein the user interaction causes the first representation to illustrate a dolly moving toward the second representation illustrating the virtual character, and the third representation applies the color over the first representation and the second representation when the virtual dolly would be in contact with the virtual character.

18. The computer-implemented method of claim 15, wherein the user interaction comprises at least one of: a body movement, a hand gesture, a gaze, or a sound.

19. The computer-implemented method of claim 14, further comprising:
- simulating, with the one or more physical computer processors and the one or more AR components, capture of the movie set using the portion the first object data and a portion of the second object data; and
- displaying, via the AR device, the capture onto a view of the movie set.

20. The computer-implemented method of claim 19, wherein the capture comprises the second representation onto the prop.

* * * * *